US012568930B1

(12) United States Patent
Chen

(10) Patent No.: US 12,568,930 B1
(45) Date of Patent: Mar. 10, 2026

(54) TRAVEL PET NEST

(71) Applicant: Wenzhou Zuochen Automotive Supplies Co., Ltd., Wenzhou (CN)

(72) Inventor: Shipeng Chen, Wenzhou (CN)

(73) Assignee: Wenzhou Zuochen Automotive Supplies Co., Ltd., Wenzhou (CN)

( * ) Notice: Subject to any disclaimer, the term of this patent is extended or adjusted under 35 U.S.C. 154(b) by 0 days.

(21) Appl. No.: 19/377,369

(22) Filed: Nov. 3, 2025

(51) Int. Cl.
A01K 1/035 (2006.01)
A47C 27/10 (2006.01)

(52) U.S. Cl.
CPC .................................. A01K 1/0353 (2013.01)

(58) Field of Classification Search
CPC ....... A01K 1/0353; A01K 1/035; A47C 27/10
See application file for complete search history.

(56) References Cited

U.S. PATENT DOCUMENTS

2006/0288943 A1* 12/2006 Ku ........................ A01K 1/0353
119/28.5
2009/0151647 A1* 6/2009 Burrows .............. A01K 1/0218
119/515

FOREIGN PATENT DOCUMENTS

CN 2544525 Y * 4/2003
DE 2543914 A * 4/1977
DE 29718625 U1 * 1/1998
DE 29718627 U1 * 1/1998

* cited by examiner

*Primary Examiner* — Kristen C Hayes
(74) *Attorney, Agent, or Firm* — Westbridge IP LLC

(57) ABSTRACT

A travel pet nest includes a pet nest body and an inner pad located in an inner ring of the pet nest body. The pet nest body includes a fabric layer and an inflatable inner bladder. The fabric layer includes a bottom fabric layer and a side fabric layer. The inflatable inner bladder is placed on the bottom fabric layer, and the side fabric layer is wrapped around the inflatable inner bladder. One end of the side fabric layer is fixedly connected to the bottom fabric layer, and the other end thereof is detachably connected to the bottom fabric layer. A foldable partition sheet is provided inside the inflatable inner bladder through high-frequency welding to divide an internal space of the inflatable inner bladder into first and second pressure zones. The travel pet nest may provide both comfort and structural stability when a pet leans against it.

10 Claims, 5 Drawing Sheets

TRAVEL PET NEST

TECHNICAL FIELD

The present disclosure belongs to the technical field of pet supplies, and particularly, relates to a travel pet nest.

BACKGROUND

At present, more and more families will take domestic pets, such as dogs or cats, with them during long trips or short wild camping. Since it is not convenient for domestic pets such as dogs or cats to rest in tents used by people, people need to bring pet nests to their trip or wild camping destinations so that domestic pets can have a place to sleep or lie down.

As shown in FIGS. 1-2, the commercially available pet nest solves the problem of inconvenient portability by providing an inflatable and deflatable air bag or an inflatable inner bladder 200 in the pet nest. In Chinese Patent Publication CN222193589U, an inflatable pet bed is disclosed. The inflatable pet bed is provided with a fabric sleeve 100. The fabric sleeve 100 includes multiple side enclosure sleeves 101 and an inner pad sleeve 102. The side enclosure sleeves 101 are provided around the top periphery of the inner pad sleeve 102. Each side enclosure sleeve 101 forms an annular side enclosure chamber. The inner pad sleeve 102 is arranged with an inner pad chamber. Inflatable side enclosures are arranged in the side enclosure sleeves 101 with a hollow inflatable inner bladder structure. A flexible inner pad is provided in the inner pad sleeve 102. The convenient hollow inflatable inner bladder structure of the pet bed allows for easy folding and storage after deflation, facilitating transportation, as shown in FIG. 1.

However, since each of the multiple side enclosure sleeves 101 is provided with a hollow inflatable inner bladder structure that can only provide a single air pressure, when a domestic pet (especially a medium-large domestic pet) sleeps or lies against the side enclosure sleeves 101, the side enclosure sleeves 101 may either become excessively rigid and uncomfortable due to excessively high air pressure in the hollow inflatable inner bladder, or excessively flexible and prone to collapse due to excessively low air pressure in the hollow inflatable inner bladder. FIG. 3 shows the collapsible deformation of the side enclosure sleeves 101 on the left and rear sides due to the excessively low air pressure in the hollow inflatable inner bladder, thereby failing to well balance the support provided by the multiple side enclosure sleeves 101 of the pet bed to the pet and the comfort experienced by the pet when leaning against the side enclosure sleeves 101.

Similarly, US Patent Application Publication US20200315130A1 also has similar drawbacks as those described above.

Therefore, there is an urgent need to provide a travel pet nest to solve the technical problem in the related art where the hollow inflatable inner bladder structure provided in pet bed can only provide a single air pressure, failing to well balance the support provided by the multiple side enclosure sleeves of the pet bed to the pet and the comfort experienced by the pet when leaning against the side enclosure sleeves.

SUMMARY

A primary object of the present disclosure is to provide a travel pet nest, aiming to solve the technical problem in the related art where a hollow inflatable inner bladder structure provided in a pet bed can only provide a single air pressure, failing to well balance the support provided by multiple side enclosure sleeves of the pet bed to the pet and the comfort experienced by the pet when leaning against the side enclosure sleeves.

To achieve the foregoing object, the present disclosure provides a travel pet nest, including: a pet nest body including a fabric layer and an inflatable inner bladder.

The fabric layer includes a bottom fabric layer and a side fabric layer; the inflatable inner bladder is placed on the bottom fabric layer, and the side fabric layer is wrapped around the inflatable inner bladder; one end of the side fabric layer is fixedly connected to the bottom fabric layer, and the other end of the side fabric layer is detachably connected to the bottom fabric layer.

An internal space of the inflatable inner bladder includes a first pressure zone and a second pressure zone provided adjacent to each other; both the first pressure zone and the second pressure zone are distributed along a circumferential direction of the inflatable inner bladder; the first pressure zone is located on an inner side of the internal space of the inflatable inner bladder, and the second pressure zone is located on an outer side of the first pressure zone.

The first pressure zone and the second pressure zone are communicated with a first air nozzle and a second air nozzle, respectively; when the first air nozzle and the second air nozzle are deflated, the pet nest body is capable of transitioning to a compressed and folded state.

An air pressure value of the first pressure zone is 5 kPa-8 kPa, an air pressure value of the second pressure zone is 10 kPa-18 kPa, and a ratio of the air pressure value of the first pressure zone to the air pressure value of the second pressure zone is 1:2-1:2.25.

As a preferred implementation, the internal space of the inflatable inner bladder is provided with a foldable partition sheet; the foldable partition sheet has a cylindrical shape with mutually parallel upper and lower openings; an area of the upper opening is greater than an area of the lower opening; the foldable partition sheet is provided with multiple mutually parallel annular folds distributed in a corrugated fold pattern.

The foldable partition sheet is sealingly connected to an inner wall of the inflatable inner bladder in the circumferential direction at upper and lower opening edges to divide the internal space of the inflatable inner bladder into the first pressure zone located on the inner side and the second pressure zone located on the outer side; the first pressure zone and the second pressure zone are communicated with the first air nozzle and the second air nozzle adjacent to the lower opening of the foldable partition sheet, respectively.

When the first air nozzle and the second air nozzle are deflated, the foldable partition sheet is capable of being compressed and folded along the annular folds under the action of external force.

As a preferred implementation, the pet nest further includes an inner pad; the inner pad is located in an inner ring of the pet nest body.

The pet nest body and the inflatable inner bladder each have a toroidal structure, and a ratio of an inner diameter R1 to an outer diameter R2 of the inflatable inner bladder is in a range of 1:1.6-1:1.8.

As a preferred implementation, the inflatable inner bladder has a main rotational symmetry axis, and the distribution density of the annular folds on the foldable partition sheet along a direction of the main rotational symmetry axis is 3.3 cm/fold-3.6 cm/fold; the thickness of the foldable partition sheet is 0.3 mm-0.4 mm.

As a preferred implementation, the pet nest is cut along a semi-plane bounded by the main rotational symmetry axis, and an included angle α between a line connecting intersection points formed by the upper and lower opening edges and the semi-plane and a plane where the lower opening is located is an acute angle.

As a preferred implementation, the upper and lower opening edges of the foldable partition sheet are sealingly connected to the inner wall of the inflatable inner bladder through high-frequency welding, the upper and lower openings each have a circular shape, and centers of the upper and lower openings are located on the main rotational symmetry axis.

As a preferred implementation, the first air nozzle and the second air nozzle each include a valve core and a cap that seals the valve core, and the first air nozzle is concealed by the inner pad.

As a preferred implementation, along the direction of the main rotational symmetry axis, the lower opening of the foldable partition sheet is located below an installation position of the first air nozzle on the inflatable inner bladder.

As a preferred implementation, the fabric layer is made of oxford cloth, the inner pad is a silk floss inner pad or a sponge inner pad, and the inflatable inner bladder and the foldable partition sheet are made of thermoplastic polyurethane copolymer.

As a preferred implementation, the other end of the side fabric layer is detachably connected to the bottom fabric layer through a zipper, a hook-and-loop fastener, or a button.

DETAILED DESCRIPTION OF THE EMBODIMENTS

Various aspects of the present disclosure are described in further detail below.

Unless otherwise defined or described, all technical and scientific terms used herein have the same meanings as those familiar to a person skilled in the art. Furthermore, any methods and materials similar or equivalent to those described herein may be used in the methods of the present disclosure.

To more clearly illustrate the technical solutions in the embodiments of the present disclosure or in the related art, specific implementations of the present disclosure are described below with reference to the accompanying drawings. Obviously, the drawings in the following description are merely some embodiments of the present disclosure. For a person skilled in the art, other drawings and embodiments may be obtained according to these drawings without any creative effort.

Term Explanation

Torus: a torus is a three-dimensional curved surface formed by rotating a circle around a straight line in the same plane that does not intersect the circle.

Main rotational symmetry axis of torus: an axis that passes through a center point of the torus and is perpendicular to the "equatorial plane" of the torus is referred to as the main rotational symmetry axis. The "equatorial plane" of the torus is a plane that contains the center point of the torus and is perpendicular to the main rotational symmetry axis of the torus.

Figure 1:
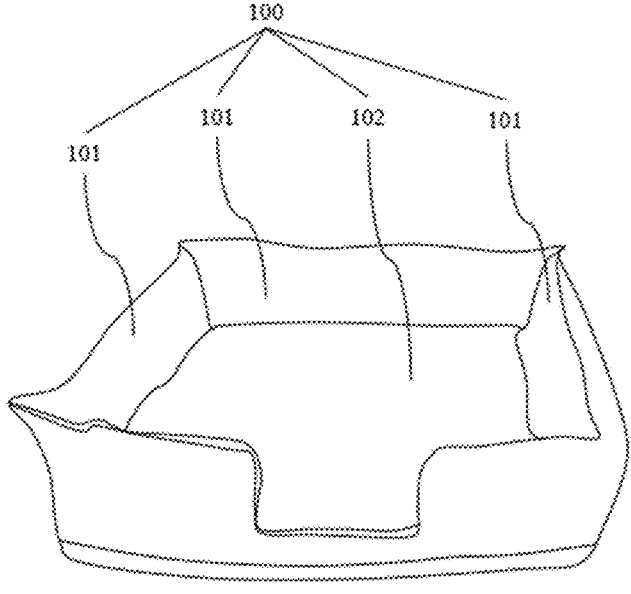
FIG. 1 is a schematic structural diagram of an inflatable pet bed according to the prior art.
Figure 2:
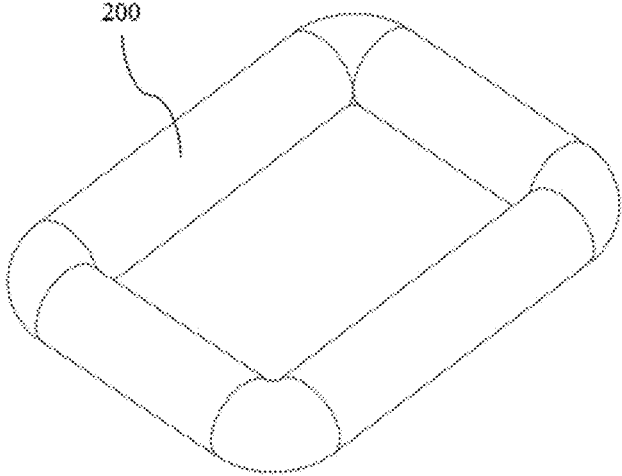
FIG. 2 is a schematic diagram of an inflatable inner bladder structure of a pet nest according to the prior art.
Figure 3:
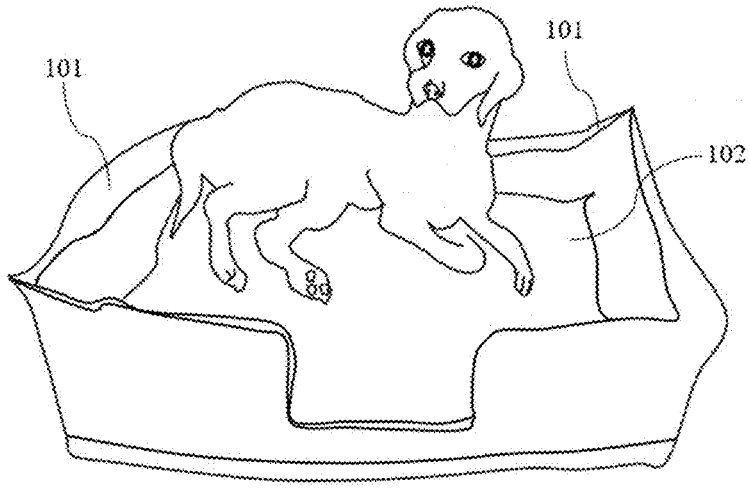
FIG. 3 is a schematic structural diagram showing the collapsible deformation of side enclosure sleeves of an inflatable pet bed according to the prior art when leaned on by a pet dog.
Figure 4:
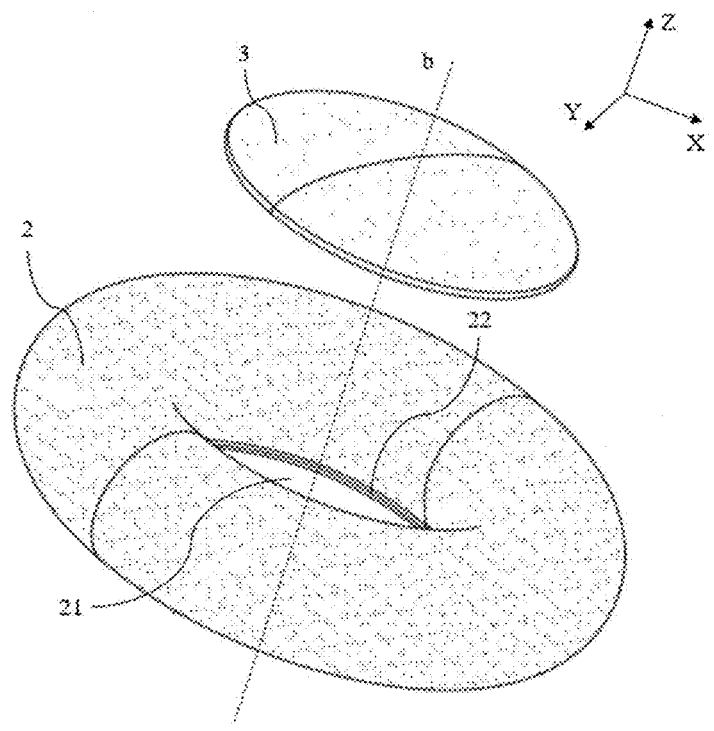
FIG. 4 is a perspective schematic diagram of a pet nest body and an inner pad of a travel pet nest in an implementation of the present disclosure.
Figures 5, 6:
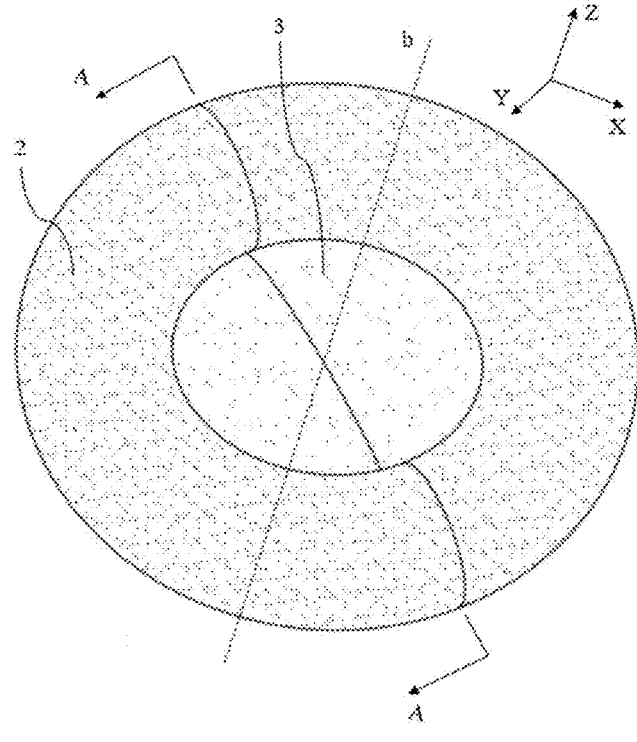
FIG. 5 is a perspective schematic diagram of a travel pet nest in an implementation of the present disclosure.
FIG. 6 is a schematic longitudinal cross-sectional view of a travel pet nest in an implementation shown in FIG. 4 taken along a line A-A.

Referring to FIGS. 4-5, in a specific embodiment, the present disclosure provides a travel pet nest, including: a pet nest body 2 having a toroidal structure; and an inner pad 3 located in an inner ring of the pet nest body 2.

Hereinafter, the structural composition of the pet nest body 2 and the inner pad 3 will be described in detail.

Referring to FIG. 6, in a specific embodiment, the pet nest body 2 includes a fabric layer and an inflatable inner bladder 24 with a toroidal structure. The inflatable inner bladder 24 has a main rotational symmetry axis b. The fabric layer includes a bottom fabric layer 21 and a side fabric layer 23. The inflatable inner bladder 24 is placed on the bottom fabric layer 21. The side fabric layer 23 is wrapped around an outer surface of the inflatable inner bladder 24. One end of the side fabric layer 23 is fixedly connected to the bottom fabric layer 21, and the other end of the side fabric layer 23 is detachably connected to the bottom fabric layer 21 after being wrapped around the outer surface of the inflatable inner bladder 24. The bottom fabric layer 21 is a portion of the fabric layer that is substantially horizontal when the pet nest body 2 is in normal use.

In a specific embodiment, the fabric layer is an oxford cloth layer, and the raw materials of the oxford cloth include polyester (polyester fiber) or nylon (polyamide fiber). The polyester oxford cloth has strong sun resistance, good stability (e.g., resistance to insect damage, resistance to acid and alkali corrosion, and minimal deformation after washing), and medium abrasion resistance. The nylon oxford cloth has excellent abrasion resistance and tear resistance but poor sun resistance. Through research, the applicant found that a fabric layer obtained by combining the polyester oxford cloth and the nylon oxford cloth may further optimize the usability of the pet nest.

Specifically, the side fabric layer 23 adopts the polyester oxford cloth, which has a tight fabric structure formed by warp and weft yarns of 420D-600D using a 2-warp and 2-weft basket weave. This structure may reduce the risk of snagging when pets scratch, improve the fit when wrapping the inflatable inner bladder, and facilitate folding and storage. The thickness of the side fabric layer 23 is 0.35 mm-0.5 mm.

The bottom fabric layer 21 adopts the nylon oxford cloth, which has a tight fabric structure formed by warp and weft yarns of 600D-700D using a 2-warp and 2-weft basket weave. This structure may withstand frequent stepping of pets entering and exiting, as well as friction from ground gravel. To enhance the waterproofness of the nylon oxford cloth layer, a solvent-based Polyurethane (PU) coating may be applied to its bottom surface. The thickness of the bottom fabric layer 21 is 0.6 mm-0.7 mm.

One end of the side fabric layer 23 is fixedly connected to the bottom fabric layer 21, and the specific operation steps are as follows.

1. One end of the side fabric layer 23 and a corresponding connecting edge of the bottom fabric layer 21 are neatly trimmed to ensure that there is no burr. If the bottom fabric layer 21 has a PU coating, the coating layer needs to be folded inward.
2. The neatly trimmed end of the side fabric layer 23 and corresponding connecting edge of the bottom fabric layer 21 are overlapped by 1.5 cm-2 cm, and the overlapping position is fixed using a plastic positioning clip to ensure that the overlapping portion is not twisted.
3. An industrial double-needle lockstitch sewing machine is started to sew a first thread 0.5 cm from an inner side of the overlapping edge, and then sew a second thread 1 cm from an outer side. The two threads are parallel and spaced approximately 0.5 cm apart.

In a specific embodiment, the other end of the side fabric layer 23 is detachably connected to the bottom fabric layer 21 through a detachable connecting piece 22 by setting the detachable connecting piece 22 as any one of a zipper, a hook-and-loop fastener, or a button.

Figure 7:
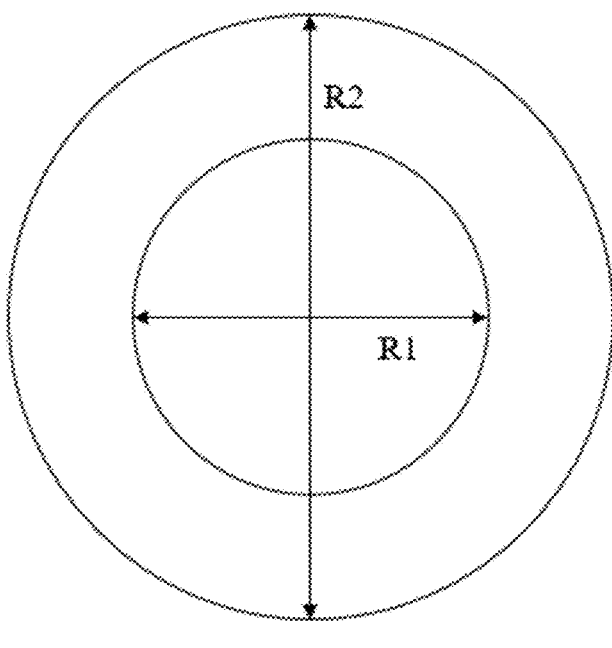
FIG. 7 is a top view of an inflatable inner bladder of a travel pet nest in an implementation of the present disclosure.

Referring to FIG. 7, in a specific embodiment, a ratio of an inner diameter R1 to an outer diameter R2 of the inflatable inner bladder 24 with a toroidal structure is in a range of 1:1.6-1:1.8. When the ratio of the inner diameter R1 to the outer diameter R2 is greater than 1:1.6, the rollover resistance of the inflatable inner bladder 24 is insufficient. When the ratio of the inner diameter R1 to the outer diameter R2 is less than 1:1.8, the space occupied by the inflatable inner bladder 24 during normal use of the pet nest becomes larger. Further, for small domestic pets (weight of 2 kg-4 kg, body length of 30 cm-40 cm), the value of the inner diameter R1 of the inflatable inner bladder 24 is in a range of 40 cm-50 cm. For medium domestic pets (weight of 5 kg-7 kg, body length of 40 cm-50 cm), the value of the inner diameter R1 of the inflatable inner bladder 24 is in a range of 50 cm-60 cm. For the medium-large domestic pet (weight of 8 kg-10 kg, body length of 50 cm-60 cm), the value of the inner diameter R1 of the inflatable inner bladder 24 is 60 cm-70 cm. The value range of the inner diameter R1 may ensure that the domestic pet obtains sufficient rest or sleeping space in the inner ring of the pet nest.

In a specific embodiment, a foldable partition sheet 4 is provided on an inner wall of the inflatable inner bladder 24 through high-frequency welding. The foldable partition sheet 4 divides an internal space of the inflatable inner bladder 24 into a first pressure zone and a second pressure zone that are not communicated with gas. The first pressure zone and the second pressure zone are both distributed along a circumferential direction of the inflatable inner bladder. The first pressure zone is located on an inner side of the internal space of the inflatable inner bladder 24, and the second pressure zone is located on an outer side of the internal space of the inflatable inner bladder 24. The second pressure zone is located away from the inner ring of the pet nest body 2 compared with the first pressure zone. An air pressure value of the first pressure zone is smaller than an air pressure value of the second pressure zone, and a first air nozzle 26 and a second air nozzle 25 for inflation and deflation are communicated with positions of the first pressure zone and the second pressure zone adjacent to the bottom fabric layer 21, respectively.

In a specific embodiment, the air pressure value of the first pressure zone is in a range of 5 kPa-8 kPa. Thus, the area of the inflatable inner bladder 24 corresponding to the first pressure zone can softly fit the body parts (especially the trunk and limbs) of the domestic pet when lying on the side, avoid the pressure caused by excessive hardness, and simultaneously provide basic support. The air pressure value of the second pressure zone is in a range of 10 kPa-18 kPa. Thus, the area of the inflatable inner bladder 24 corresponding to the second pressure zone can provide sufficient hardness to resist the trampling and impact of the pet and prevent unfavorable situations such as rollover of the pet nest. More preferably, a ratio of the air pressure value of the first pressure zone to the air pressure value of the second pressure zone is in a range of 1:2-1:2.25 so that the first pressure zone and the second pressure zone form a suitable pressure gradient to provide stable support for the pet. It should be noted that the setting of the first pressure zone and the second pressure zone, in combination with the setting of the range of the ratio of the inner diameter R1 to the outer diameter R2 of the inflatable inner bladder 24, acts synergistically to further enhance the rollover resistance of the pet nest.

In a specific embodiment, the inflatable inner bladder 24 and the foldable partition sheet 4 are preferably made of Thermoplastic Polyurethane (TPU) copolymer. TPU is a non-porous elastomer material with strong gas tightness. The foldable partition sheet 4 made of TPU material does not require an additional gas tightness coating (such as Chloroprene Rubber (CR) coating or Silicone Rubber (SR) coating) to meet the requirements of pressure partition. Further, the shore hardness of TPU may be flexibly adjusted. When the shore hardness of the foldable partition sheet 4 is set to 60 A-85 A, the foldable partition sheet 4 may exhibit good elasticity and bending resistance, maintaining its gas isolation effect even after hundreds of folds. In addition, since the air pressure value of the second pressure zone is greater than the air pressure value of the first pressure zone, the TPU foldable partition sheet may resist deformation caused by the pressure difference, ensuring the normal using function of the first pressure zone and the second pressure zone.

Figure 8:
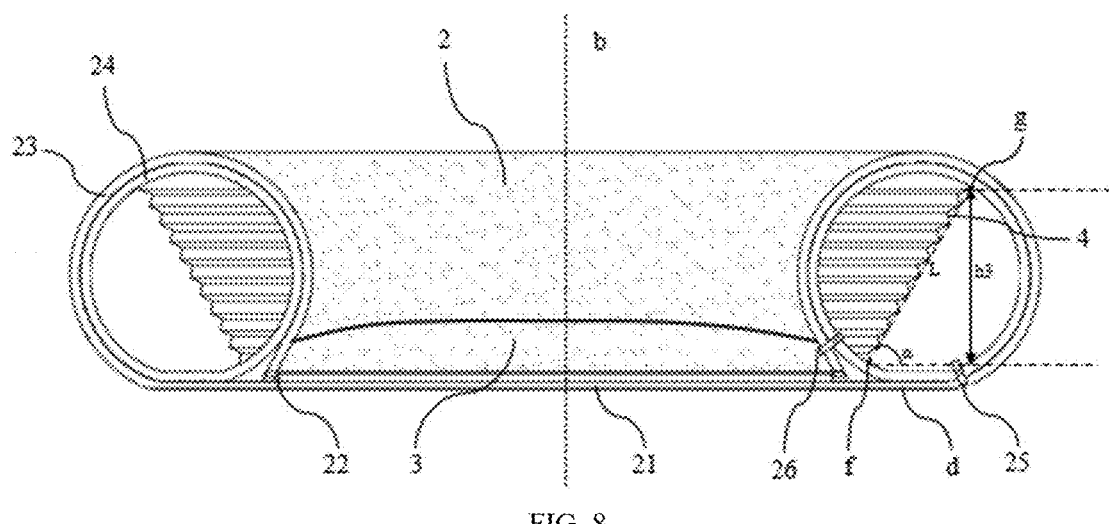
FIG. 8 is a schematic longitudinal cross-sectional view of a travel pet nest in another implementation shown in FIG. 4 taken along a line A-A.
Figure 9:
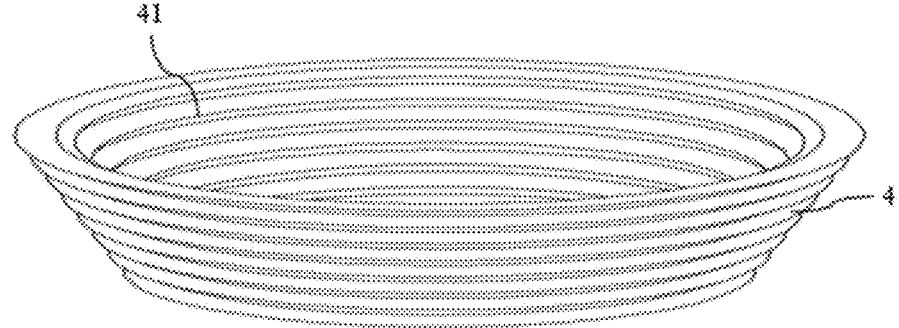
FIG. 9 is a perspective schematic diagram of a foldable partition sheet of a travel pet nest in an implementation of the present disclosure.
Figure 10:
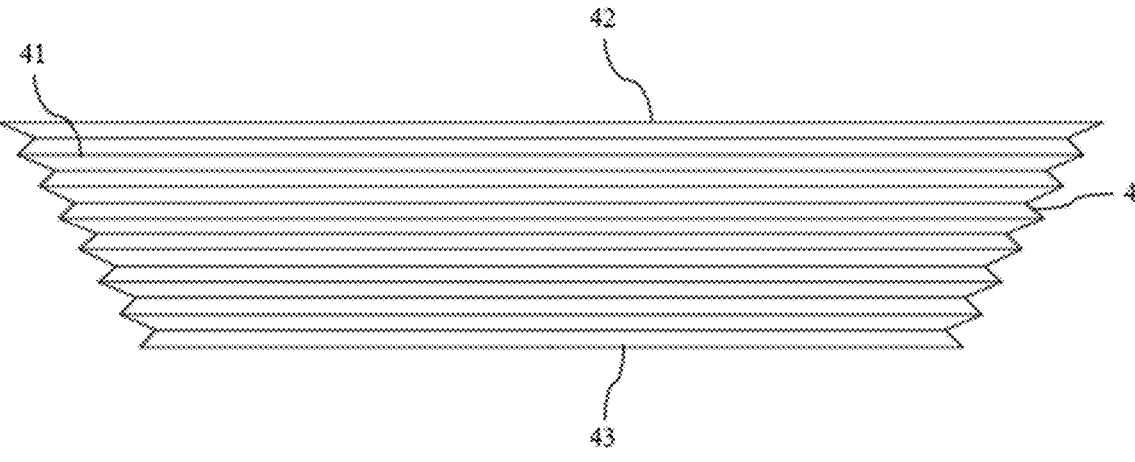
FIG. 10 is a front view of a foldable partition sheet of a travel pet nest in an implementation of the present disclosure.

Referring to FIGS. 8-9, in a specific embodiment, the foldable partition sheet 4 made of PU material is a frustum-shaped cylinder with upper and lower openings. The shapes of the upper opening and the lower opening are both circular, and centers of the upper opening and the lower opening are located on the main rotational symmetry axis b. An area of the upper opening is greater than an area of the lower opening. Multiple annular folds 41 that are parallel to both the upper opening and the lower opening are prefabricated on the frustum-shaped cylinder. The surface of the frustum-shaped cylinder provided with multiple annular folds 41 exhibits a "Z"-shaped corrugated pattern. The frustum-shaped cylinder may be compressed and folded along the annular folds 41 in the direction of the main rotational symmetry axis b under the action of an external force. In addition, the polar group in the TPU molecular structure may be activated through a high-frequency electric field, enabling high-strength welding between the inner wall of the inflatable inner bladder 24 body and an edge 42 of the upper opening and high-strength welding between the inner wall of the inflatable inner bladder 24 body and an edge 43 of the lower opening of the foldable partition sheet 4. The seam exhibits excellent sealing performance and is resistant to cracking, thereby stably dividing the internal space of the inflatable inner bladder 24 into the first pressure zone and the second pressure zone.

In a specific embodiment, the distribution density of the annular folds 41 on the foldable partition sheet 4 along the direction of the main rotational symmetry axis b is 3.3 cm/fold-3.6 cm/fold. The thickness of the foldable partition sheet 4 is 0.3 mm-0.4 mm. It should be noted that if the distribution density is lower than 3.3 cm/fold, the fold spacing is too large, and the foldable partition sheet 4 needs to overcome a greater material bending stress during folding, resulting in laborious folding and difficulty in compaction. Meanwhile, a small number of folds cannot achieve "multi-layer compact folding". If the distribution density is higher than 3.6 cm/fold, the fold spacing is too small, and "stacking dislocation between layers" (i.e., inconsistent folding directions of adjacent folds) is prone to occur after folding, resulting in an increase in storage volume. For example, the diameter of the upper opening of the foldable partition sheet 4 is 50 cm, the diameter of the lower opening is 30 cm, and the generatrix length of the frustum-shaped cylinder of the foldable partition sheet 4 is 22.36 cm. When the thickness of the foldable partition sheet 4 is 0.3 mm-0.5 mm, the data of the folded height and the force required for folding are shown in Table 1.

TABLE 1

| Thickness of foldable partition sheet (mm) | Density of annular folds (cm/fold) | Folded height (cm) | Force required for folding (N) |
|---|---|---|---|
| 0.3 | 2.5 | 11.0 | 28.1 |
| 0.3 | 3.0 | 6.7 | 18.5 |
| 0.3 | 3.3 | 4.2 | 12.5 |
| 0.3 | 3.6 | 4.7 | 14.0 |
| 0.3 | 4.0 | 7.4 | 17.0 |
| 0.4 | 2.5 | 11.3 | 29.0 |
| 0.4 | 3.0 | 6.9 | 19.2 |
| 0.4 | 3.3 | 4.4 | 13.1 |
| 0.4 | 3.6 | 4.9 | 14.8 |
| 0.4 | 4.0 | 7.6 | 17.5 |
| 0.5 | 3.3 | 5.5 | 18.6 |
| 0.5 | 3.6 | 6.0 | 20.2 |

It should be noted that although the thickness of the foldable partition sheet 4 may be set thinner, for example, 0.2 mm, under such conditions, the performance in terms of the 1,500-cycle cracking rate is inferior to that of the foldable partition sheet 4 when the thickness is 0.3 mm-0.4 mm, resulting in a shorter service life.

Referring to FIG. 8, in a specific embodiment, the pet nest is cut along a plane where the main rotational symmetry axis b is located. The upper opening edge 42 and the lower opening edge 43 form an intersection point g and an intersection point f, respectively, with the plane. The intersection point g and the intersection point f are located on the same side of the main rotational symmetry axis b, and the distance between the intersection point g and the intersection point f is L. A distance from the point g to the plane where the lower opening is located is h3. An included angle α between a line connecting the intersection point g and the intersection point f and the plane where the lower opening is located is defined as a base angle α. Thus, $$\sin\alpha = \frac{h3}{L}, \text{ and } \alpha = \arcsin\frac{h3}{L}.$$

The base angle α is an acute angle. More preferably, the base angle α is 45°.

Referring to FIG. 8, along the direction of the main rotational symmetry axis b, the position of the intersection point F is below an installation point of the first air nozzle 26 on the inflatable inner bladder 24.

In a specific embodiment, the inner pad 3 is a silk floss inner pad or a sponge inner pad with a suitable thickness to block the first air nozzle 26, preventing the first air nozzle 26 from being within the view range of the domestic pet, thus avoiding it from being damaged due to the pet's interest. The inner pad 3 abuts against the side fabric layer 23, making the inner pad 3 less prone to move under external force.

Further, the outer side of the silk floss inner pad or the sponge inner pad may be covered with a layer of 600D-700D nylon oxford cloth to provide the inner pad 3 with excellent abrasion resistance and tear resistance.

Test Example 1: Pressure Partition Function Verification Test

Test Object:

Referring to FIG. 7, the inflatable inner bladder 24 with a toroidal structure of the travel pet nest sample has an inner diameter of 50 cm and an outer diameter of 90 cm, and the height of the inflatable inner bladder 24 along the direction of the main rotational symmetry axis b is 20 cm. The sponge inner pad (with a thickness of 5 cm) is wrapped with 600D nylon oxford cloth and has a diameter of 48 cm. The distribution density of the annular folds 41 on the TPU foldable partition sheet 4 along the direction of the main rotational symmetry axis b is 3.3 cm/fold-3.6 cm/fold. The thickness of the foldable partition sheet 4 is 0.3 mm-0.4 mm. The base angle α between the TPU foldable partition sheet 4 and the plane where the lower opening is located is equal to 45°. The shore hardness of the TPU foldable partition sheet 4 is 70 A. The distance L between the intersection point g and the intersection point f on the plane is equal to 14.14 cm, and the distance h3 between the point g and the plane where the lower opening is located is equal to 10 cm.

Test Device:

Digital pressure gauge, 4 kg, 7 kg, and 10 kg standard counterweight blocks (simulating pets of different weights), displacement sensor, and timer.

Test Steps:

(1) The first pressure zone is inflated to 6 kPa through the first air nozzle 26, and the second pressure zone is inflated to 13.5 kPa through the second air nozzle 25, standing for 30 min. The digital pressure gauge is adopted to confirm that there is no attenuation of the air pressure in the two pressure zones (the air leakage≤0.2 kPa/30 min is qualified).

(2) The inner pad 3 is inputted into the inner ring of the inflatable inner bladder 24 to ensure that the inner pad completely covers the first air nozzle 26, and the edge of the inner pad abuts against the side fabric layer 23 without displacement.

(3) 4 kg (small domestic pet), 7 kg (medium domestic pet), and 10 kg (medium-large domestic pet) counterweight blocks are leaned against the inner side (first pressure zone) of the inflatable inner bladder, the deformation depths are measured using the displacement sensor, and whether the outer side (second pressure zone) collapses is observed.

(4) The leaning-withdrawal action is repeated 100 times, and the air pressure attenuation and deformation data is measured again to verify the durability.

Test Results:

Air leakage≤0.1 kPa/30 min, inner deformation of 3-5 cm, outer displacement≤1 cm. After 100 cycles, there is no obvious performance attenuation (deformation change≤10%), and the pressure partition function verification test is qualified.

Test Example 2: Foldable Partition Sheet Durability Test

Test Purpose:

Whether the annular folds 41 of the TPU foldable partition sheet 4 are stable after repeated inflation and deflation without cracking or air leakage.

Test Object:

Same as the TPU foldable partition sheet 4 in test example 1.

Test Device:

Inflation and deflation pump (with pressure control), low-temperature incubator (−20° C.), and high-temperature incubator (60° C.).

Test Steps:

(1) Normal temperature test: in an environment of 25° C., the cycle of "inflating the first pressure zone to 6 kPa through the first air nozzle 26, inflating the second pressure zone to 13.5 kPa through the second air nozzle 25, standing for 5 min, and then completely deflating and folding" is performed and repeated 1,000 times. After each cycle, whether there are cracks in the folds and whether the welding seams leak are checked.

(2) High and low temperature test: after placing the TPU foldable partition sheet 4 in an environment of −20° C. for 4 hours and an environment of 60° C. for 4 hours, the above inflation and deflation cycle is repeated 500 times to observe the integrity of the folds.

Test Results:

After 1,500 cycles, there are no cracks at the annular folds 41 and no bubbles at the welding seams (no air leakage in the underwater inflation test), and the TPU foldable partition sheet 4 can still maintain the frustum-shaped cylindrical expansion shape.

Comparative Example 1: Single-Pressure Travel Pet Nest Function Verification Test Test Object:

The inflatable inner bladder 24 with a toroidal structure of the travel pet nest sample has an inner diameter of 50 cm and an outer diameter of 90 cm, and the height of the inflatable inner bladder 24 along the direction of the main rotational symmetry axis b is 20 cm. The sponge inner pad (with a thickness of 5 cm) is wrapped with 600D nylon oxford cloth and has a diameter of 48 cm.

Test Device:

Digital pressure gauge, 4 kg, 7 kg, and 10 kg standard counterweight blocks (simulating pets of different weights), displacement sensor, and timer.

Test Steps:

(1) Pretreatment

For each group, the set air pressure (5 kPa/9 kPa/13.5 kPa) is pretreated: the single-pressure inflatable inner bladder is inflated to the target air pressure, standing for 30 min. The air leakage is confirmed using the digital pressure gauge (≤0.2 kPa/30 min is qualified to ensure consistent basic gas tightness). The inner pad is installed, and it is verified that the air nozzle is blocked.

(2) Core Performance Test (1) Comfort Test 4 kg/7 kg/10 kg counterweight blocks are placed at the center of the inner ring of the inflatable inner bladder (simulating a pet's lying posture), the deformation depths of the inner sidewall of the inflatable inner bladder are measured using the displacement sensor (taking the average of three evenly spaced points), and the relationship of "air pressure-weight-deformation depth" is recorded.

(2) Support Test

Anti-collapse test: the counterweight block is leaned against the inner sidewall of the inflatable inner bladder (simulating pet leaning), and whether any significant collapse occurs on the outer sidewall is observed and recorded.

Rollover resistance test: the inflatable inner bladder is placed on a horizontal platform, and a 10 kg counterweight block is positioned on the edge of the inner ring (5 cm from the side wall). The platform is slowly tilted to 15°/30°/45°, and whether the inflatable inner bladder rolls over (if an overall tilt angle exceeding the surface tilt angle by 10°, a rollover occurs) is recorded.

The test results are shown in Table 2.

TABLE 2

| Air pressure setting | Weight | Inner deformation depth | Outer collapse displacement | Rollover at 30° platform tilt | Summary of test results |
|---|---|---|---|---|---|
| 5 kPa | 4 kg | 6-8 mm | 2-3 mm | Yes (rollover at 40° tilt) | Good comfort, but very poor support, prone to collapse and rollover |
| | 7 kg | 9-12 mm | 3-4 mm | Yes (rollover at 25° tilt) | Same as above, and inner pad displacement caused by |

TABLE 2-continued

| Air pressure setting | Weight | Inner deformation depth | Outer collapse displacement | Rollover at 30° platform tilt | Summary of test results |
|---|---|---|---|---|---|
| | 10 kg | 13-15 mm | 4-5 mm | Yes (rollover at 15° tilt) | excessive deformation Severe collapse, unable to support medium-large pets |
| 9 kPa | 4 kg | 2-3 mm | 0.5-1 mm | No | Improved support, but excessive small deformation, resulting in poor fit |
| | 7 kg | 4-5 mm | 1-1.5 mm | No | Marginally balanced comfort and support, but no sense of fit |
| | 10 kg | 6-7 mm | 1.5-2 mm | No (rollover at 35° tilt) | Slight collapse during leaning of medium-large pets |
| 13.5 kPa | 4 kg | 1-2 mm | 0-0.3 mm | No | Excellent support, but excessive hardness, lacking comfort |
| | 7 kg | 2-3 mm | 0.3-0.5 mm | No | Stiff feel, pets with no sense of being cradled |
| | 10 kg | 3-4 mm | 0.5-0.8 mm | No | Optimal support, but worst comfort |

9 kPa group test example 1 is selected for comparative analysis.

| Comparison dimension | Test example 1 (pressure partition: 6 kPa + 13.5 kPa) | Comparative example 1 (single pressure: 9 kPa) | Advantages of test example 1 |
|---|---|---|---|
| Comfort | 4 kg/7 kg/10 kg counterweight deformation 3-5 mm, excellent fit | 4 kg/7 kg/10 kg counterweight deformation 2-7 mm, poor fit | The low air pressure on the inner side achieves a precise fit, avoiding the extreme problem of "too hard/too soft" with single pressure |
| Support | Outer displacement ≤ 1 cm, no rollover | Outer collapse 1-2 mm, 10 kg counterweight rollover at 35° | The high air pressure on the outer side provides a stable support, enhancing the collapse resistance and rollover resistance performance by 30%-50% |

Based on the present disclosure, users skilled in the art will appreciate that one aspect described herein may be implemented independently of any other aspect, and that two or more of these aspects may be combined in various ways. For example, the device may be implemented and/or the method may be practiced using any number and aspects set forth herein. In addition, the device may be implemented and/or the method may be practiced using other structures and/or functionalities in addition to one or more of the aspects set forth herein.

It should be noted that the above-mentioned embodiments may be freely combined as needed. The above description is only a preferred implementation of the present disclosure. It should be pointed out that for users skilled in the art, several modifications and retouches may be made without departing from the principles of the present disclosure, and these modifications and retouches should also be regarded as the protection scope of the present disclosure.

All documents mentioned in the present disclosure are incorporated herein by reference as if each document had been individually incorporated by reference. Furthermore, it is to be understood that, upon reading the foregoing contents of the present disclosure, users skilled in the art may make various changes or modifications to the present disclosure, and such equivalent forms also fall within the scope defined by the appended claims.

What is claimed is:

1. A travel pet nest, comprising:

a pet nest body comprising a fabric layer and an inflatable inner bladder;

wherein the fabric layer comprises a bottom fabric layer and a side fabric layer; the inflatable inner bladder is placed on the bottom fabric layer, and the side fabric layer is wrapped around the inflatable inner bladder; one end of the side fabric layer is fixedly connected to the bottom fabric layer, and the other end of the side fabric layer is detachably connected to the bottom fabric layer;

an internal space of the inflatable inner bladder comprises a first pressure zone and a second pressure zone provided adjacent to each other; both the first pressure zone and the second pressure zone are distributed along a circumferential direction of the inflatable inner bladder; the first pressure zone is located on an inner side of the internal space of the inflatable inner bladder, and the second pressure zone is located on an outer side of the first pressure zone;

the first pressure zone and the second pressure zone are communicated with a first air nozzle and a second air nozzle, respectively; when the first air nozzle and the second air nozzle are deflated, the pet nest body is capable of transitioning to a compressed and folded state; and an air pressure value of the first pressure zone is 5 kPa-8 kPa, an air pressure value of the second pressure zone is 10 kPa-18 kPa, and a ratio of the air pressure value of the first pressure zone to the air pressure value of the second pressure zone is 1:2-1:2.25.

2. The travel pet nest according to claim 1, wherein the internal space of the inflatable inner bladder is provided with a foldable partition sheet; the foldable partition sheet has a cylindrical shape with mutually parallel upper and lower openings; an area of the upper opening is greater than an area of the lower opening; the foldable partition sheet is provided with multiple mutually parallel annular folds distributed in a corrugated fold pattern;

the foldable partition sheet is sealingly connected to an inner wall of the inflatable inner bladder in the circumferential direction at upper and lower opening edges to divide the internal space of the inflatable inner bladder into the first pressure zone located on the inner side and the second pressure zone located on the outer side; the first pressure zone and the second pressure zone are communicated with the first air nozzle and the second air nozzle adjacent to the lower opening of the foldable partition sheet, respectively; and when the first air nozzle and the second air nozzle are deflated, the foldable partition sheet is capable of being compressed and folded along the annular folds under the action of external force.

3. The travel pet nest according to claim 2, further comprising an inner pad, wherein the inner pad is located in an inner ring of the pet nest body; and the pet nest body and the inflatable inner bladder each have a toroidal structure, and a ratio of an inner diameter R1 to an outer diameter R2 of the inflatable inner bladder is in a range of 1:1.6-1:1.8.

4. The travel pet nest according to claim 3, wherein the inflatable inner bladder has a main rotational symmetry axis, and the distribution density of the annular folds on the foldable partition sheet along a direction of the main rotational symmetry axis is 3.3 cm/fold-3.6 cm/fold.

5. The travel pet nest according to claim 4, wherein the pet nest is cut along a semi-plane bounded by the main rotational symmetry axis, and an included angle α between a line connecting intersection points formed by the upper and lower opening edges and the semi-plane and a plane where the lower opening is located is an acute angle.

6. The travel pet nest according to claim 5, wherein the upper and lower opening edges of the foldable partition sheet are sealingly connected to the inner wall of the inflatable inner bladder through high-frequency welding, the upper and lower openings each have a circular shape, and centers of the upper and lower openings are located on the main rotational symmetry axis.

7. The travel pet nest according to claim 6, wherein the first air nozzle and the second air nozzle each comprise a valve core and a cap that seals the valve core, and the first air nozzle is concealed by the inner pad.

8. The travel pet nest according to claim 7, wherein along the direction of the main rotational symmetry axis, the lower opening of the foldable partition sheet is located below an installation position of the first air nozzle on the inflatable inner bladder.

9. The travel pet nest according to claim 8, wherein the fabric layer is made of oxford cloth, the inner pad is a silk floss inner pad or a sponge inner pad, and the inflatable inner bladder and the foldable partition sheet are made of thermoplastic polyurethane copolymer.

10. The travel pet nest according to claim 9, wherein the other end of the side fabric layer is detachably connected to the bottom fabric layer through a zipper, a hook-and-loop fastener, or a button.

* * * * *